(12) United States Patent
Homann et al.

(10) Patent No.: US 12,090,682 B2
(45) Date of Patent: Sep. 17, 2024

(54) METHOD AND SYSTEM FOR PRODUCING A THREE-DIMENSIONALLY DEFORMED PLATE

(71) Applicant: Homann Holzwerkstoffe GmbH, Munich (DE)

(72) Inventors: Fritz Homann, Munich (DE); Markus Wahlen, Apach (FR); Micha Wessel, Merzig (DE); Matthias Schulte, Saarlouis (DE)

(73) Assignee: Homann Holzwerkstoffe GmbH, Munich (DE)

( * ) Notice: Subject to any disclaimer, the term of this patent is extended or adjusted under 35 U.S.C. 154(b) by 576 days.

(21) Appl. No.: 17/318,098

(22) Filed: May 12, 2021

(65) Prior Publication Data

US 2021/0354328 A1 Nov. 18, 2021

(30) Foreign Application Priority Data

May 15, 2020 (DE) .......................... 102020113284.0

(51) Int. Cl.
*B27M 1/02* (2006.01)
*E04C 2/34* (2006.01)
*E06B 3/70* (2006.01)

(52) U.S. Cl.
CPC ............. *B27M 1/02* (2013.01); *E04C 2/3405* (2013.01); *E06B 3/7015* (2013.01);
(Continued)

(58) Field of Classification Search
CPC ....................................................... B27M 1/02
(Continued)

(56) References Cited

U.S. PATENT DOCUMENTS 538,496 A * 4/1895 Berst et al. ............... B27M 3/32
144/30
3,591,448 A * 7/1971 Elmendorf ............... B27M 1/02
428/218

(Continued)

FOREIGN PATENT DOCUMENTS

CA 2988159 C 11/2019
EP 2660408 B1 7/2017
(Continued)

OTHER PUBLICATIONS

Russian Office Action regarding Patent Application No. 2021112747, dated Oct. 4, 2022.

*Primary Examiner* — Andrew D Graham
(74) *Attorney, Agent, or Firm* — Harness, Dickey & Pierce, P.L.C.

(57) ABSTRACT

A method for manufacturing a three-dimensionally deformed plate made of a wood fiber material comprises providing a prefabricated, flat wood fiber material plate as the original plate, preheating the original plate in sections, wetting the preheated section of the original plate with an atomized liquid mixture of water and a separating agent, introducing a section of the original plate that is preheated and wetted with a liquid mixture of water and a separating agent between two rollers of a molding station, wherein the rollers respectively provide a corrugated profile in the peripheral direction of the external surface, such that the original plate is being deformed in sections into a plate with a wave shape, wherein rollers are being used, the respective profiling of which has half-waves which follow one another in the peripheral direction and which at least partially have a different extension in the peripheral direction.

12 Claims, 5 Drawing Sheets

(52) U.S. Cl.
CPC ............... *E04C 2002/3466* (2013.01); *E06B 2003/7019* (2013.01); *E06B 2003/7025* (2013.01)

(58) Field of Classification Search
USPC ........................................................ 144/380
See application file for complete search history.

(56) References Cited

U.S. PATENT DOCUMENTS

| | | | | |
|---|---|---|---|---|
| 4,509,571 | A | * | 4/1985 | Peters ................ B27M 3/0086 72/197 |
| 5,067,536 | A | * | 11/1991 | Liska .................... B27N 3/143 144/380 |
| 5,247,975 | A | * | 9/1993 | Tanahashi ............... B27M 1/02 144/380 |
| 5,612,129 | A | * | 3/1997 | Karhuketo ......... B29B 17/0026 428/221 |
| 5,972,265 | A | * | 10/1999 | Marra .................. B27N 1/0263 425/81.1 |
| 6,783,714 | B1 | * | 8/2004 | Locati ..................... B27N 1/00 264/118 |
| 8,268,430 | B2 | * | 9/2012 | Johnson .................. B27N 3/04 428/221 |
| 2004/0154862 | A1 | * | 8/2004 | Carlson ................... G10D 3/22 181/293 |
| 2005/0006004 | A1 | * | 1/2005 | Kamke ................. B27K 5/001 144/380 |
| 2008/0256823 | A1 | * | 10/2008 | Knorr ..................... B27M 1/02 144/380 |
| 2010/0062233 | A1 | * | 3/2010 | Cohen ............... B65D 19/0067 428/452 |
| 2011/0062636 | A1 | * | 3/2011 | Lewellin ................. B27N 3/00 264/475 |
| 2011/0089611 | A1 | * | 4/2011 | Hoffman ................. B27N 3/24 425/151 |
| 2012/0027999 | A1 | * | 2/2012 | Liang .................... B29C 65/48 156/196 |
| 2015/0027586 | A1 | * | 1/2015 | Trost ....................... B27D 5/00 144/3.1 |
| 2016/0067882 | A1 | * | 3/2016 | Kokocinski ............ B27L 11/08 144/4.6 |
| 2016/0292539 | A1 | * | 10/2016 | Krech .................. G06Q 10/087 |
| 2017/0266839 | A1 | * | 9/2017 | Batty ..................... B27N 3/002 |
| 2019/0233214 | A1 | * | 8/2019 | Levine .................... B65G 15/34 |
| 2020/0276749 | A1 | * | 9/2020 | Homann ................. B27N 3/18 |

FOREIGN PATENT DOCUMENTS

| | | |
|---|---|---|
| EP | 3275611 A1 | 1/2018 |
| EP | 3066272 B1 | 4/2018 |
| EP | 3456498 A1 | 3/2019 |
| RU | 1736051 C | 11/1994 |
| WO | WO-2011034479 A1 | 3/2011 |

* cited by examiner

Fig. 2

METHOD AND SYSTEM FOR PRODUCING A THREE-DIMENSIONALLY DEFORMED PLATE

CROSS-REFERENCE TO RELATED APPLICATIONS

This application claims the benefit of German Patent Application No. 102020113284.0, filed on May 15, 2020. The entire disclosure of the application referenced above is incorporated herein by reference.

FIELD

The invention relates to a method for manufacturing a three-dimensionally deformed plate made of a wood fiber material. Furthermore, the invention relates to a system for manufacturing a three-dimensionally deformed plate made of a wood fiber material based on the method.

BACKGROUND

Three-dimensionally deformed plates made of a wood fiber material are known per se in the state of the art. For example, they serve as a core layer for a sandwich board. Such a sandwich board can be used for example as a furniture plate or a door leaf. Herein, such a sandwich board consists of a core layer, which is provided on at least one side, typically on both sides with a top layer. The core layer can be formed by a three-dimensionally deformed plate, whereas the top layers are usually formed by flat plates.

EP 2 660 408 B1 for example discloses a core layer in this sense. This aforesaid core layer comprises wooden elements, which are formed in a zigzag shape, and which are connected with each other, preferably glued together. Herein, a variety of such wooden elements are used for forming the core layer, which wooden elements respectively comprise plate-shaped areas, which are arranged in a zigzag shape, wherein one zig-area of a wooden element forms a common edge with an adjacent zag-area of the same wooden element. The wooden elements, which are adjacent to the edge, form intersections between each other, in which adjacent wooden elements are connected to each other.

A core layer, which is formed by wooden elements, is also known from EP 3 066 272 B1. Also according to this state of the art, the wooden elements are formed in a zigzag shape, wherein a zig-area is attached to a zag-area with interposition of a common edge, though the zig-areas, as well as the zag-areas, just as the common edge, can each be configured in a curved shape, whereby a wavelike extension is obtained.

Both of the aforementioned publications EP 2 660 408 B1 and EP 3 066 272 B1 have in common, that a variety of wooden elements are used respectively for forming a core layer, wherein the wooden elements are to be randomized and permanently connected to each other for forming a core layer. In contrast to this, EP 3 456 498 A1 discloses a method for manufacturing a three-dimensionally deformed plate made of a wood fiber material, in which a prefabricated, flat MDF board is used as the original plate, which will subsequently be reshaped into a corrugated plate in a molding station. Herein, the method takes place continuously, and at the end of the deformation there is an integrally formed waveplate, which can also be used as a core layer for a sandwich board.

The molding station provided according to the state of the art according to EP 3 456 498 A1 for reshaping the flat MDF plate into a waveplate, comprises a pair of rollers with two rollers, which respectively comprise a wave shaped profiling outside. This wave shaped profiling of the rollers ensures, that the plate that is supplied to the molding station is reformed into a corrugated plate. Herein, the emerging wave patterns are sinusoidal, which means that equally formed half-waves result, wherein after a positive half-wave a negative half-wave follows etc.

The aforesaid method known from the EP 3 456 498 A1 relates to a generic method and has proven itself in the everyday practical application. Nevertheless, there is a need for improvement, as it has been shown that the aforesaid wave shaped form of the three-dimensionally deformed plate is not equally suitable for all areas of application. Therefore, it is the object of the invention to provide a method as well as a system for manufacturing a three-dimensionally deformed plate, which enable a simple and cost-efficient manufacturing of a three-dimensionally deformed plate, wherein different shapes of the plates should be possible in an easy way, depending on the future application.

SUMMARY

For the solution of this task the invention proposes a method for producing a three-dimensionally deformed plate made of a wood fiber material, the method comprising the following steps: providing a prefabricated, flat wood fiber material plate as the original plate, pre-heating the original plate in sections, wetting one of the preheated sections of the original plate with an atomized liquid mixture, comprising water and a separating agent, introducing one of the sections of the original plate, which is preheated and wetted with a liquid mixture comprising water and a separating agent, between two rollers of a molding station, wherein the rollers respectively provide a profiling, which is wave-shaped in the circumferential direction, so that the original plate is deformed in sections into a plate with a wave shape, wherein rollers are being used, whose respective profiling comprise sequential half-waves in the circumferential direction, which half-waves comprise at least partly a different extension in the circumferential direction.

The starting point of the method, according to the invention, is a prefabricated, flat wood fiber material plate. This one serves as the original plate. Herein, the wood fiber material plate can be a clutch of glued, pre-compressed fibers, as well as a prepressed fiberboard. Preferably, the wood fiber material plate is a MDF plate. In particular, with a prepressed fiberboard, different densities can be used, depending on the later application of the corrugated plate, which is produced according to the method according to the invention. It is only of essential importance for the invention that a flat plate made of a wood fiber material is being used as the original plate for the method.

The term "wood fiber material" generally means, in the sense of the invention, a material comprising lingo-cellulosic fibers or chips, which preferably also comprises wood fibers or wood chips, which means it contains them. There can also be fibers or chips from other materials, which are mixed with the wood fibers and wood chips. Generally, lingo-cellulosic fibers or chips are present, either as a pad, as a clutch, or as a prepressed plate. Herein, in case of a scattered pad or a clutch, the fibers or chips can comprise glue or not comprise any glue. In this respect, the term "plate", in the sense of the invention, also means a scattered pad from lingo-cellulosic fibers or chips, or a clutch from such fibers and chips. It is only significant for the method, that a scattered pad from lingo-cellulosic fibers or chips, a prepared clutch, or a firmly pressed plate is a semi-finished product, which is planar, and serves as a starting point for the method, according to the invention. In this respect, the invention is not limited to a firmly pressed plate, made only from wood fibers, as a starting point.

The original plate is initially being preheated. This is carried out in sections, by moving the plate continuously forward past a heating device. The section of the work plate, which is located in an overlap with the heating device, is therefore being heated. For example, infrared heaters, which irradiate the original plate from the one side as well as from the other side, whereby a heating takes place from the top as well as from the bottom, can be used as heating devices. Alternatively, microwave devices, contact heat transmitters, and/or the like can also be used as heating devices. It is significant, that the heating of the original plate, with the aid of the heating device, can happen until a sufficient temperature level is achieved.

The preheating of the original plate serves as a preparation of the next process step. Accordingly, it is provided, that the original plate is being wetted, namely with an atomized liquid mixture, comprising water and a separating agent. As a result of the atomization, an aerosol is being created, which places itself on top of the preheated section of the original plate. In this respect, a wetting of the preheated section of the original plate is obtained.

As an atomized liquid mixture, a mixture of water and a separating agent is being used. The water serves in the further course of the process, to produce water steam, which is being needed for a later deformation of the original plate. The meaning and purpose of the separating agent is to ensure that the original plate, which is to be reshaped, does not adhere to the rollers of the molding station. As a mixing ratio of water to separating agent, a mixing ratio can be chosen for example in the range comprised between 99:1 and 1:99, preferably in the range comprised between 99:1 and 50:50, and even more preferably in the range comprised between 99:1 and 90:10.

The preheating of the original plate serves in particular, to ensure that the liquid mixture is being spread homogeneously on the respective surfaces of the original plate. Furthermore, it is also being achieved by means of the preheating, that the liquid mixture, which is being applied on the original plate, already has achieved a certain preheating, such that it is assured, that the vaporization of the water in the following molding station is also guaranteed.

Depending on the used heating devices, it can also be provided, that the preheating in sections of the original plate and the wetting in sections of the original plate, take place in one process step. It is significant, that a homogeneous distribution of the liquid mixture on the original plate is obtained, such that on the one hand, a homogeneous distribution of the separating agent is being achieved, and on the other hand, that the applied water achieves such a pre-temperature, that the vaporization of the water afterwards is being safely assured. Furthermore, the preheating ensures a complete heating of the wood fiber material plate up to the center layer of the material of the wood fiber material plate. This heating contributes to the softening of the fiber composite and supports the deformation.

The section of the original plate, which is, according to the previous process steps preheated and wetted with a liquid mixture comprising water and a separating agent, is then being guided between two rollers of a molding station. The rollers are spaced from each other and have a gap between each other, which gap size is smaller than the thickness of the original plate. The original plate is therefore being compressed and at the same time being reshaped between the two rollers. Herein, the rollers respectively provide a wave shaped profiling in the peripheral direction on the outside, such that the original plate is being deformed into a plate with a wave shape. Herein, that section of the work plate is always being deformed, which is just located between the rollers of the molding station. Since the method is overall executed continuously, it results in a continuous deformation in sections of the flat original plate into a wave shaped deformed plate.

It is significant for the invention, that rollers are being used, the respective profiling of which has sequential half-waves in the circumferential direction, which at least partly comprise a different extension in the circumferential direction. Therefore, the intended periodic length provided per half-wave varies, wherein at least two different half periodic lengths are provided. According to that, it is provided, that the respective profile of the rollers provides half-waves, which have different lengths, that means that they have a different extension in the peripheral direction. The result of that embodiment is that even though the deformed original plate is wave-shaped, the individual wave crests or rather wave troughs have a different extension in the longitudinal direction of the plate. The result is a wave configuration that differs from the sinusoidal wave configuration. This has the advantage, that a waveform can be obtained, which is more optimally adapted to the forces applied in the later application. It is especially possible to realize an improved force introduction into the plate. Furthermore, it allows the different extension of the half-waves in the longitudinal direction of the plate, so that possible functional elements, which have to be connected to the plate, can be arranged more optimally, due to the fact of the improved force application. Functional elements are in this sense especially fasteners, such as screws, nuts or the like, but also connection means, connection elements, holders and/or the like.

The embodiment according to the invention is especially suitable for the later application of the deformed plate as a core layer of a sandwich board, for example of a furniture board or a door leaf. That is because the embodiment according to the invention makes it possible to arrange the functional elements, which are intended for a typical application of a door leaf and/or a furniture board, on the provided areas of the deformed plate or rather create appropriate areas, which are especially suitable for an arrangement of such functional elements, due to the waveform. This simplifies the later application and moreover offers fields of application for the corrugated plate, which otherwise would not be given in this way.

Furthermore, it is possible to keep different formed rollers available, which come into use depending on the deformation task of the molding station. This enables an optionally different configuration of the shape of the plate, so that an extended range of applications is given.

According to another feature of the invention, it is provided, that rollers are being used, whose respective profiling has half-waves, which are designed essentially planar at least in sections, for forming an essentially flat contact surface on the plate side.

According to this feature, at least a few of the half-waves have in parts an essentially planar form. Hereby, an essentially flat contact surface is being created, which enables the arrangement of the connection elements or rather functional elements to be fully supported by the deformed plate for an optimized introduction of force in a later application of the deformed plate. This is not possible with a completely sinuous shaped wave design, as it is known from the state of the art, for example according to EP 3 456 498 A1.

The essentially planar configuration can for example be achieved by the half-wave having a plateau. Thereby, the half-wave can be configured as a positive half-wave, i.e. as a wave crest, or a negative half-wave, that means as a wave trough. The plateau, which is provided by the half-wave, is preferably essentially aligned in a plane-parallel manner to the zero line, whereby the plateau leads to a contact surface on the side of the plate, which essentially extends in a plane-parallel manner to the center line of the plate. This enables an arrangement, which is aligned with respect to the center line, of functional elements on the plate.

In this context, according to another feature of the invention, it is being proposed, that also a bar body or the like can be used as a functional element. Such a bar body is to be aligned transversally to the longitudinal direction of the plate and to be arranged within a wave trough. Such a bar body then extends inside this wave trough, wherein an essentially plane configuration of the wave trough entails the advantage, that the bar body can be connected to the plate while forming a full-surface contact with it. This enables that plane shaped bar bodies can simply be used, whereby it is not necessary to use bar bodies, which are, in a separate working step, to be adapted to a certain profiling of the plate.

Alternatively, it is provided, according to another feature of the invention, that rollers are being used, the profiling of which has half-waves, which are at least essentially concave or convex in sections for forming an essentially curved contact surface on the side of the plate. This enables a shape that deviates from the plateau configuration, which in particular serves to be able to accommodate functional elements, which are correspondingly configured, in a position-optimized manner. In this way, it is also possible to create fixing points, which are configured very differently in their geometric arrangement, which can form an improved connection to the top layers of a sandwich board, when used in a later application of the three-dimensionally deformed plate as a core layer of a sandwich board.

With regard to the geometric design of the three-dimensionally deformed plate, the most diverse shapes are principally conceivable. These ones can be mathematically illustrated, for example by means of a correspondingly formed upper curve of a sine wave. It is therefore only essential for the invention, that a configuration is being proposed by the invention, which insofar differs from a sinusoidal shaped waveform, that at least two half-wave types are provided, which have a different extension in the circumferential direction of the rollers, and thus provide a different half periodic duration. Herein, the invention is not limited to the formation of only two different half-waves. Rather a variety of different half-waves can be provided, which can also follow each other in a different order, as desired. Thereby, the individual half-waves can provide essentially flat formed contact surfaces, essentially curved formed contact surfaces or otherwise formed contact surfaces. In an advantageous manner, it is hereby possible to provide such a configuration, with regard to the later application, which enables an optimized force distribution and/or absorption, in fact either used independently as a wavy plate or in a combined use with top layers as a sandwich board.

According to another feature of the invention, it is provided that rollers are being used, the respective profiling of which exclusively has negative or positive half-waves. According to that, the profiling only provides negative or positive half-waves. These ones sequentially line up in the circumferential direction, whereby some of the half-waves have a different extension in the peripheral direction compared to the other half-waves.

Alternatively, according to another feature of the invention, it is provided that exclusively rollers are being used, the profiling of which has alternating sequential positive and negative half-waves in the peripheral direction. Accordingly, a wave profiling is being used, which has wave crests and wave troughs, which line up sequentially in the longitudinal direction of the plate, i.e. in the peripheral direction of the rollers. Herein, at least a few of these half-waves, in accordance to the embodiment corresponding to the invention, are being stretched in the peripheral direction, such that corresponding contact surfaces on the side of the plate can be configured for the arrangement in particular of functional elements.

According to another feature of the invention, it is provided that rollers are being used, the respective profiling of which has two different half-wave configurations, wherein after three half-waves of a first half-wave configuration, one half-wave of a second half-wave formation follows.

According to this improvement, corresponding to the invention, at least two different half-wave configurations are provided. Thus, a first half-wave type as well as a second half-wave type is provided. Herein, the second half-wave type can for example be such one that has a longer extension in the peripheral direction of the rollers, in contrast to the first half-wave type. As a result of this configuration, a plate configuration results, in which a certain number of shorter half-waves, that means half-waves of the first configuration, are followed by half-waves of the second configuration, followed again by half-waves of the first configuration, etc. According to a special proposal of the invention, it is being proposed in this context, that three half-waves of a first configuration are followed by one half-wave of a second configuration. This results in a pattern of three, one, three, one, etc., wherein the three half-waves always represent a half-wave of the first type and the enclosed half-wave is always one of the second type.

According to another feature of the invention, it is provided that a wood fiber material plate is being used with a surface weight comprised between 1.0 kg/m$^2$ and 3.0 kg/m$^2$. The use of such a wood fiber material plate has the advantage that there is sufficient stability with a simultaneously reduced overall weight, so that the reshaping of such a wood fiber material plate is particularly suitable for producing a deformed plate, which is used as a core layer for sandwich boards in particular is suitable for furniture construction.

According to another feature of the invention, it is provided that a wood fiber material plate is being used having a thickness comprised between 1 mm and 3 mm, preferably 2 mm. In the course of the process according to the invention, the original plate is compressed by at least 30%.

According to another feature of the invention, it is provided that the deformation will be performed at a temperature in the range comprised between 200° C. and 300° C., preferably between 200° C. and 260° C., even more preferably between 200° C. and 240° C., and the most preferably at 220° C.

The temperature is applied during the deformation in order to cause the previously applied liquid mixture of water and a separating agent to evaporate. At the moment of the deformation, the rollers resting on the top or bottom of the plate, prevent the water vapor, generated by heating, from escaping upwards or downwards. It is therefore forced into the plate material. This causes the material to soften, which then makes it possible to transform the prefabricated, flat original plate into a corrugated plate in the manner described above. Thereby, the steam in the material of the original plate provokes two things. On the one hand, the lignin, which is located in the wood fiber material, is being activated, and on the other hand, there is an activation of the residual binder, which was not fully cured during the manufacture of the prefabricated MDF-plate. During a final cooling of the deformed plate, which occurs after it has left the molding station, the lignin activated in the molding station and the activated residual binding agent harden, so that the deformed structure of the plate is maintained, and in fact permanently.

To achieve the above-described effect, the temperature must be selected accordingly, which is why the temperature ranges suggested above must be selected. Of course, it must be ensured, that an excessive temperature input does not lead to an undesirable discoloration on the surface of the plate that has to be deformed.

According to another feature of the invention, it is provided that the deformation is being performed at a line load in the range comprised between 100 N/mm and 300 N/mm, preferably between 70 N/mm and 250 N/mm, and the most preferably at 200 N/mm. Herein, the deformation is being performed with a simultaneous introduction of temperature, which then leads, in the manner already described above, to a deformation of the original plate, which was originally flat.

For the solution of the above-mentioned task, the invention also proposes a system for producing a three-dimensionally deformed plate made of a wood fiber material according to the method described above, comprising a prefabricated, flat plate made from a wood fiber material as the original plate and a treatment system comprising a preheating station, a wetting device and a molding station, wherein the molding station comprises a pair of rollers with rollers, which respectively provide a profiling on the exterior surface that is wave shaped in the peripheral direction, wherein the respective profiling has successive half-waves in the peripheral direction, which at least partially have a different extension in the peripheral direction.

A sandwich board is being proposed which has a wave plate produced by the method according to the disclosure, which is connected at least on one side, preferably on both sides, to a flat top layer.

BRIEF DESCRIPTION OF THE FIGURES

Further features and advantages of the invention become apparent from the following description by means of the Figures.

DETAILED DESCRIPTION

Figure 1:
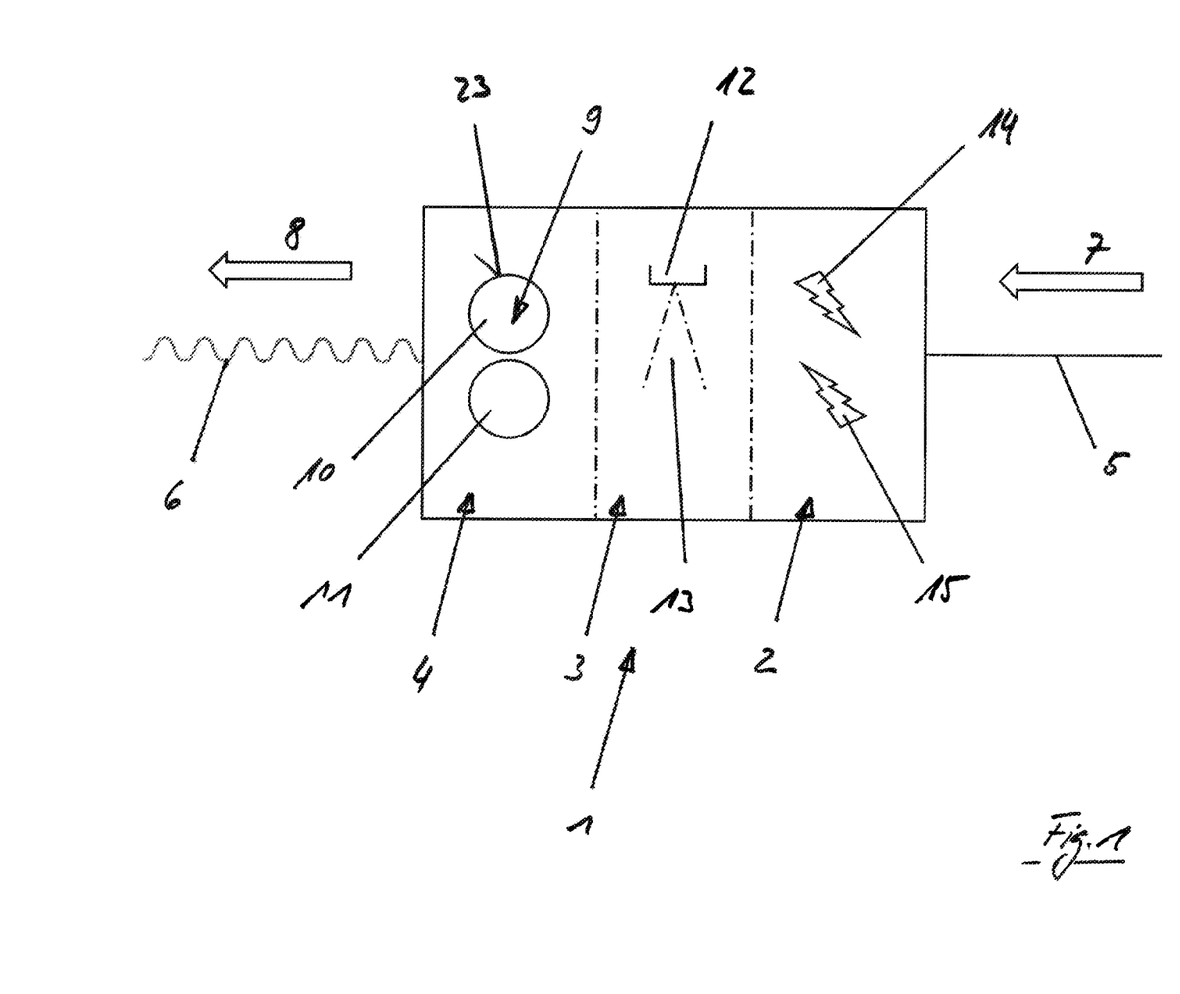
FIG. 1 shows a schematic representation of a method according to the invention.

FIG. 1 shows, in a schematic representation, a process according to the invention or rather a system according to the invention.

A treatment installation 1 is shown. This one comprises a preheating station 2, a wetting device 3, and a molding station 4.

The molding station 4 in turn comprises a pair of rollers 9. This one provides two rollers 10 and 11, which are spaced from one another while forming a gap. Every roller has an external surface 23, which is provided with a profiling, that will be described in more detail below.

The wetting station 3 provides a spraying unit 12. When used as intended, the spraying unit 12 sprays a liquid mixture of water and a separating agent, wherein an exemplarily drawn spray cone 13 is obtained. According to the embodiment shown in FIG. 1, only one spraying unit 12 is being used. It goes without saying, that a variety of such spraying units could be used, also such, which are arranged underneath a plate that is guided through the treatment installation 1.

The preheating station 2 comprises two heating devices 14 and 15. These heating devices can in particular be infrared radiators. However, other heating devices such as microwave radiators or the like are also conceivable. It is significant, that the plate is preheated during the process according to the invention, which further ensures that a liquid mixture of water and a separating agent applied to the plate is homogeneously distributed.

The treatment installation 1 described above, allows the process to be performed as follows.

A wood fiber material plate is supplied to the treatment installation 1 as the original plate in accordance with the arrow 7. Herein, the wood fiber material plate is flat and prefabricated. In the shown exemplary embodiment, the wood fiber material plate is a MDF-plate 5.

The MDF-plate 5 runs through the treatment installation 1 in the direction of the arrow 7, wherein first preheating takes place in sections, then wetting of the preheated section, and then a deformation of the plate 5 takes place in the molding station 4, such that the result is a corrugated plate 6, i.e. a three-dimensionally deformed plate 6, which leaves the treatment installation 1 in the direction of the arrow 8.

Figure 2:
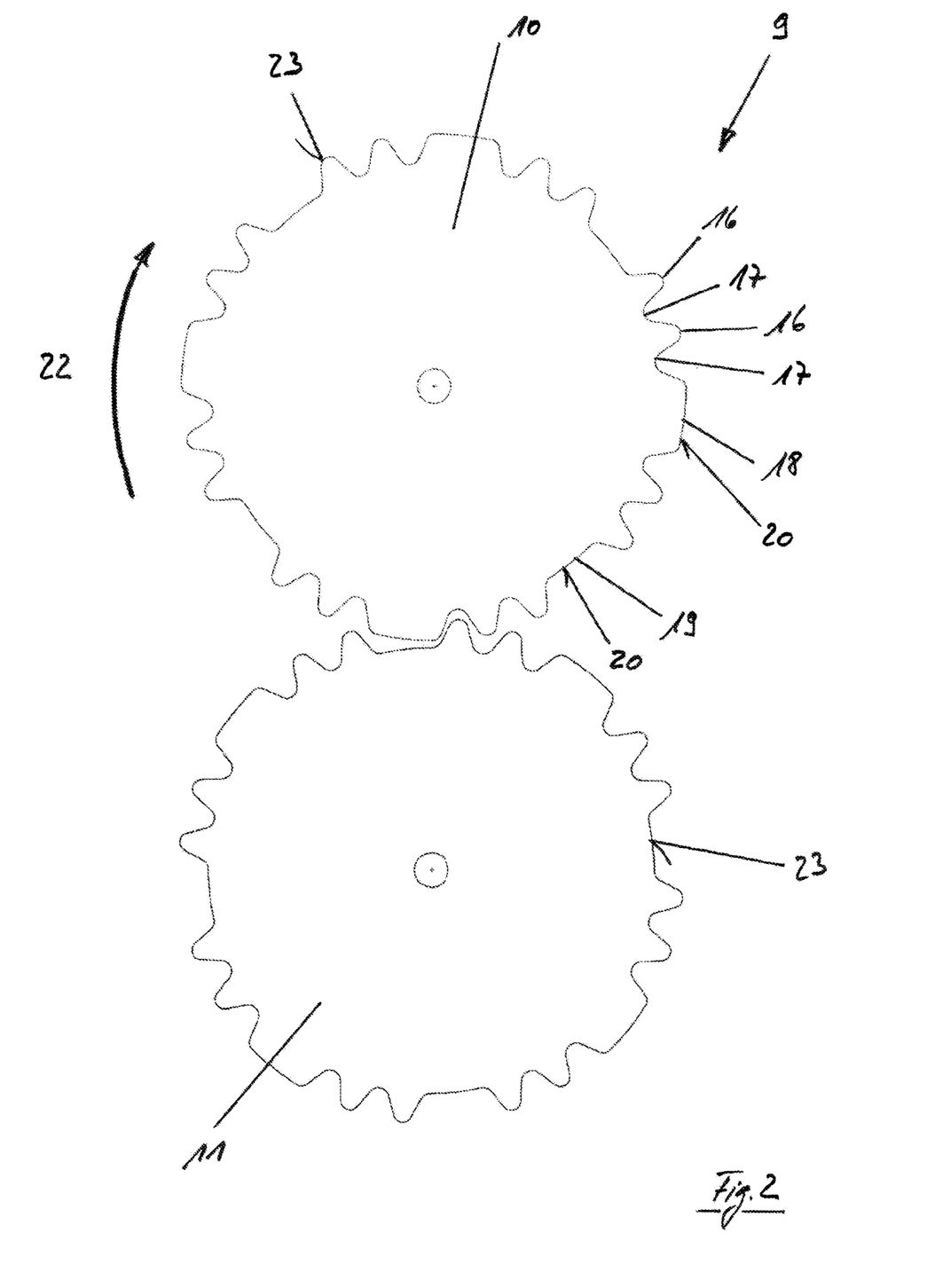
FIG. 2 shows a schematic side view of a pair of rollers of the type according to the invention.

FIG. 2 shows the rollers 10 and 11 of the roller pair 9 of the molding station 4 in a schematic side view. As it can be seen from this illustration, the rollers 10 and 11 respectively have a profiling, which has successive half-waves in peripheral direction 22. Herein, a half-wave is being formed by a wave crest or a wave trough, wherein a wave crest represents a positive half-wave and a wave trough represents a negative half-wave. With respect to a line passing through the wave shaped extension as a zero line, a wave crest represents a half-wave above the zero line and a wave trough represents a half-wave below the zero line.

As the illustration according to FIG. 2 shows by means of the example of the upper roller 10, a first half-wave 16 is followed by a second half-wave 17, a third half-wave 16, a fourth half-wave 17, a fifth half-wave 18, and so on. It is essential to the invention that the half-waves have at least partially a different extension in the peripheral direction 22, wherein the half-waves 16 and 17 each provide a first extension in the exemplary embodiment shown, whereas the half-waves 18 and 19 provide a second extension which turns out to be larger in the peripheral direction 22 than the extension of the half-waves 16 and 17. According to the wave pattern shown in FIG. 2, three half-waves of a first type, that means of a first half-wave configuration, are being followed by one half-wave of a second type, that means of a second half-wave configuration. In the shown exemplary embodiment, the half-waves 16 and 17 belong to the first half-wave type, whereas the half-waves 18 and 19 belong to the second half-wave type. Herein, the half-waves 16 and 17 of the first type only differ in that the half-waves 16 are positive half-waves and the half-waves 17 are negative half-waves. The same applies to the half-waves of the second type. Because here the half-waves 18 are positive half-waves, whereas the half-waves 19 are negative half-waves.

The half-waves 18 and 19, which extend longer in the peripheral direction 22, each provide a substantially flat plateau 20. With regard to a finally deformed plate 6, this plateau formation produces an essentially planar contact surface 24, as it can be seen from FIG. 3.

Figure 3:
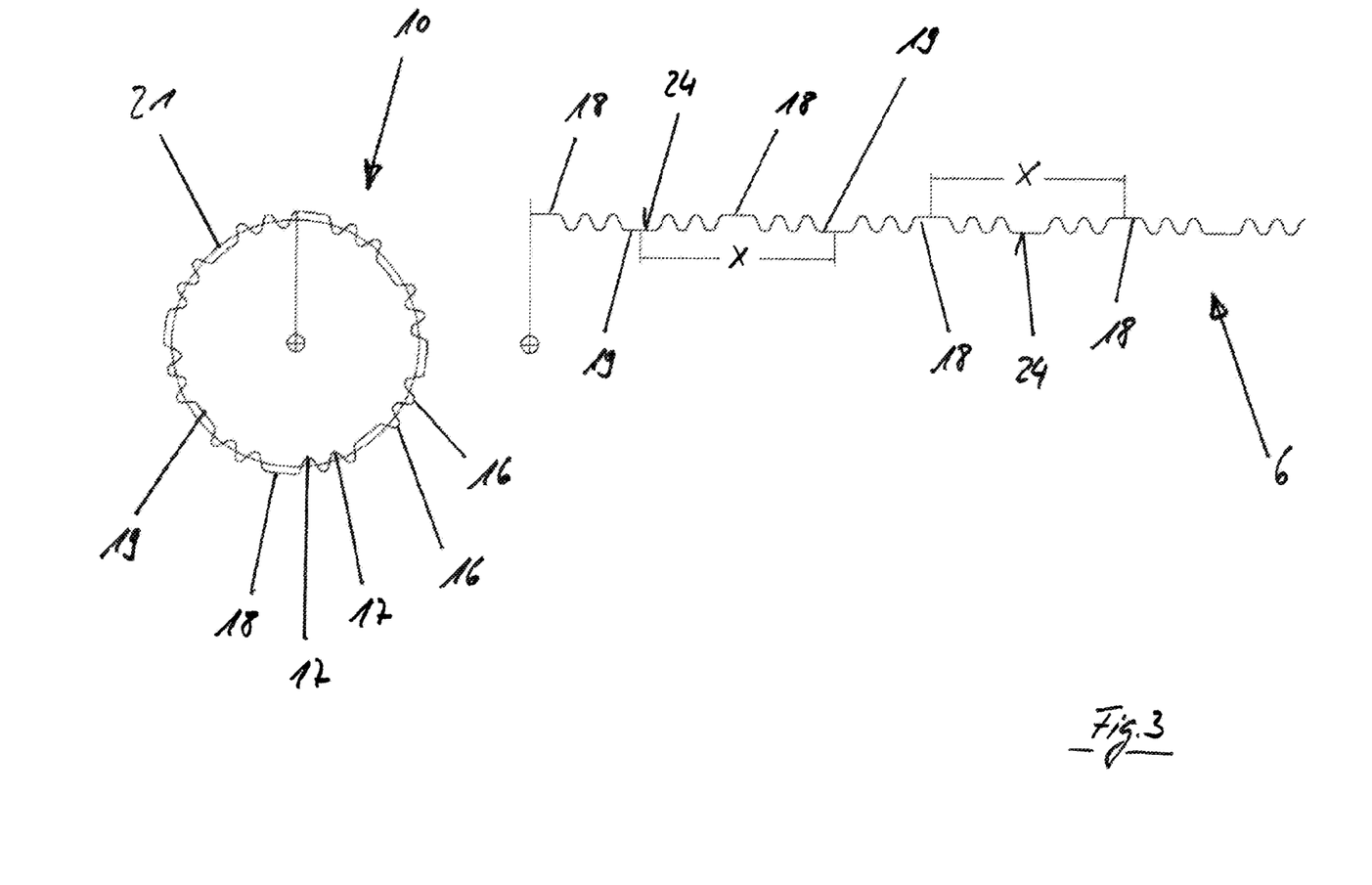
FIG. 3 shows a schematic representation of a roller embodiment according to the invention and a corrugated plate configured according to the invention.

As can be seen in FIG. 3 when viewed together, a roller is shown on the left with reference to the plane of the drawing, wherein the profile resulting with respect to the plate 6 is being represented on the right of the roller. As can be seen from this illustration, the profile of the deformed plate 6 is wave-shaped, wherein the half-waves in the longitudinal direction of the deformed plate 6 partially have a different longitudinal extension. Herein, half-waves 16 or 17 that are shorter in the longitudinal direction alternate with half-waves 18 or 19 that are longer in the longitudinal direction. A total of two wave types are provided, namely a first half-wave pair 16 or 17 and a second half-wave pair 18 or 19. Herein, the half-waves 16 are positive and the half-waves 17 are negative. The same applies to half-wave type 2. Here, the half-waves 18 are positive and the half-waves 19 are negative. The distance between two repeating waves X is 303 mm in the represented exemplary embodiment. Of course, other configurations are also conceivable here, wherein the distance X is being shown in the exemplary embodiment between two negative half-waves of type 2, in the present case the half-wave 19.

The roller shown in FIG. 3 still allows the "zero line" 21 to be recognized, around which the half-waves are respectively guided, from which wave crests, namely positive half-waves and wave troughs, that means negative half-waves, result in the manner already described.

Figure 4:
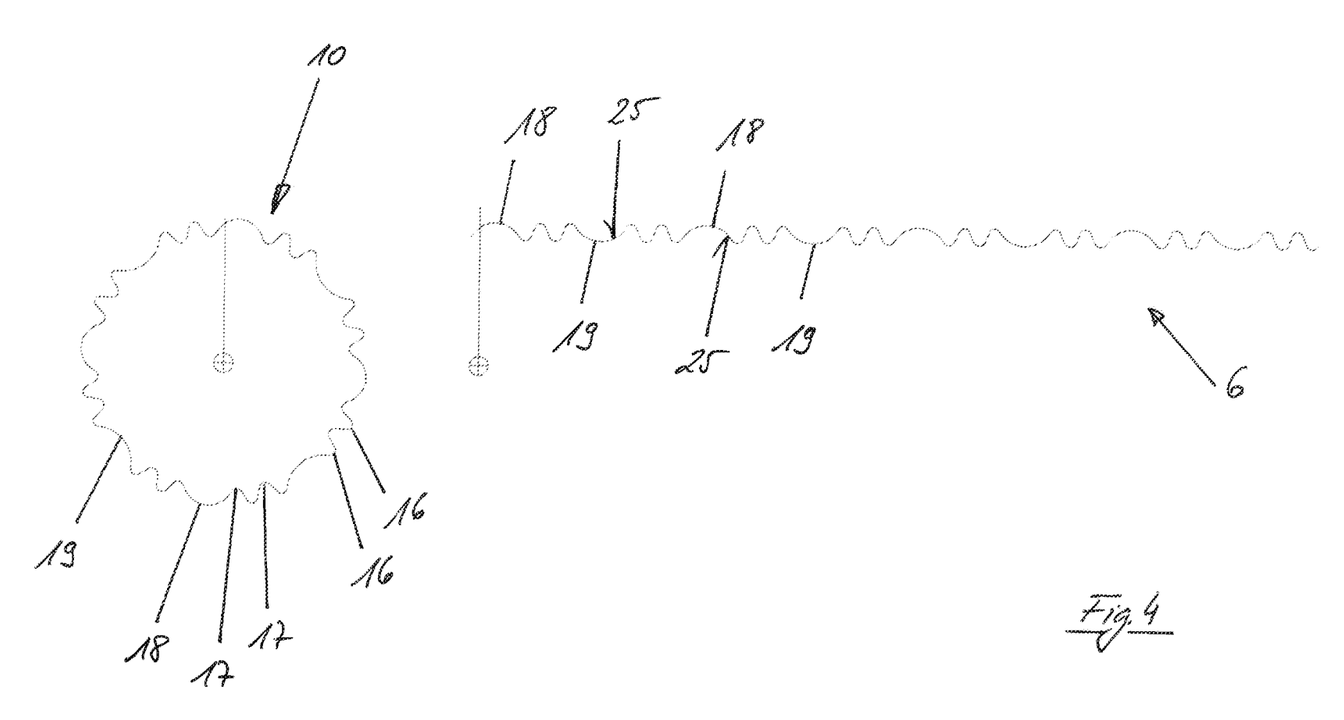
FIG. 4 shows a schematic representation of a roller embodiment according to the invention and a corrugated plate configured according to the invention according to a second embodiment.

FIG. 4 shows a schematic representation of an alternative embodiment with respect to FIG. 3. As it can be seen from this illustration, the half-waves 18 and 19 according to this exemplary embodiment do not have an essentially flat plateau, but are rather convex or concave. The result of this embodiment is a finished, deformed plate 6, which, in a manner corresponding to the embodiment of the half-waves 18 and 19, has contact surfaces 25 that are essentially curved.

The exemplary embodiments according to FIGS. 3 and 4 serve only for explanation and are not limiting. That is because the execution of the method according to the invention not only allows a plate profiling, as it is shown exemplarily in FIGS. 3 and 4. Rather, it is within the scope of the invention to choose an appropriate profile depending on the application. It is essential to the invention that half-waves 16 or 17 on the one hand and half-waves 18 or 19 on the other hand are provided, which are of different lengths in the peripheral direction of the rollers or in the longitudinal direction of the later plates, i.e. they have different extensions. Therefore, the half period duration provided depending on the half-wave differs. Herein, depending on the intended use, a large number of differently designed half-waves can be provided, as can be the arrangement of these half-waves. For example, a recurring half-wave pattern can be provided for each roller circumference, but this is not mandatory. An embodiment is also conceivable in which a recurring half-wave pattern only results from the fact that the rollers are rotated by more than 360°.

Figures 5, 6:
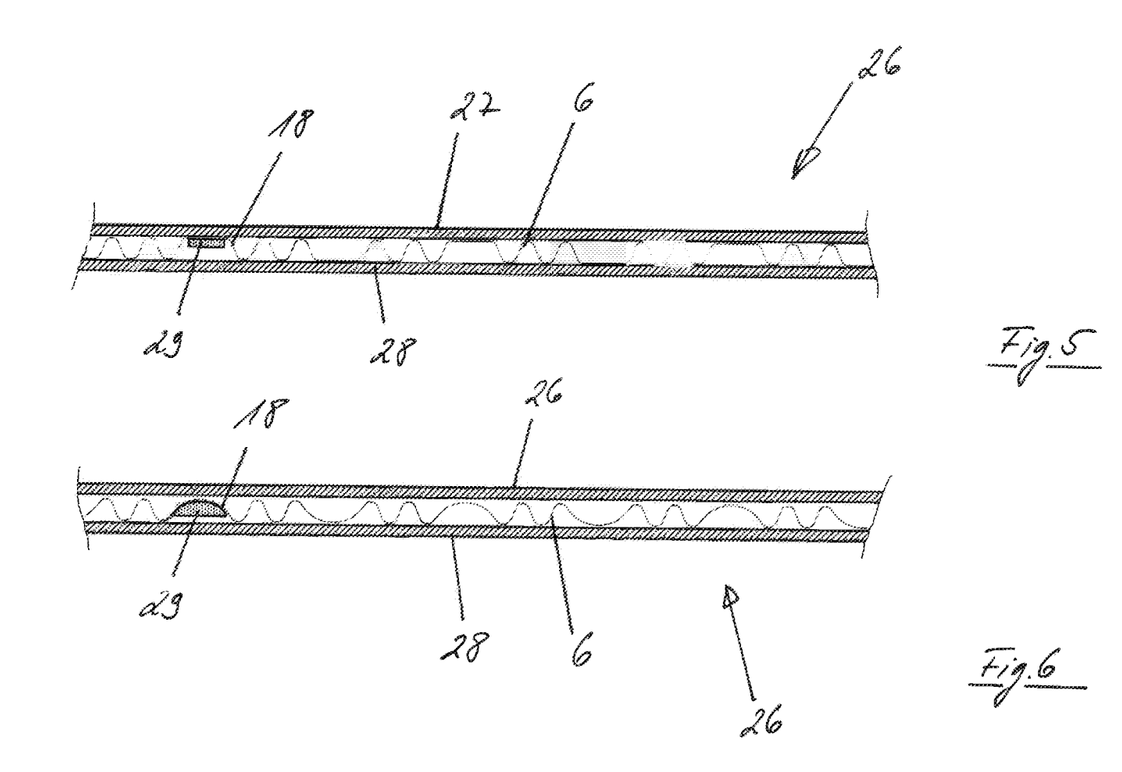
FIG. 5 shows a schematic cut view of a sandwich board with a corrugated plate according to FIG. 3
FIG. 6 shows a schematic cut view of a sandwich board with a corrugated plate according to FIG. 4.

FIGS. 5 and 6 finally show two sandwich boards 26 as an example. Herein, each sandwich board 26 respectively has a deformed plate 6 and a first cover layer 27 and a second cover layer 28. With reference to the plane of the drawing according to FIGS. 5 and 6, the cover layers 27 and 28 are each arranged on the top and the bottom of the deformed plate 6, so they take the deformed plate 6 between them.

According to the exemplary embodiment according to FIG. 5, a deformed plate 6 is being used, which corresponds to that one according to FIG. 3. However, the embodiment according to FIG. 6 shows a deformed plate 6 corresponding to the embodiment according to FIG. 4.

Functional elements 29 are shown exemplarily in FIGS. 5 and 6, each of which are arranged on the deformed plate 6. According to the exemplary embodiment according to FIG. 5, a bar with an essentially rectangular cross-section is used as a functional element 29, which rests on an essentially flat contact surface 24 of the deformed plate 6.

In contrast to this, FIG. 6 shows a functional element 29, which, on its side facing the deformed plate 6, provides a contour which corresponds to the associated curved contact surface 25 of the deformed plate 6.

What is claimed is:

1. A method for producing a three-dimensionally deformed plate made of a wood fiber material comprising:
providing a prefabricated, flat wood fiber material plate as the original plate,
preheating the original plate in sections,
wetting the preheated section of the original plate with an atomized liquid mixture of water and a separating agent, and
introducing a section of the original plate that is preheated and wetted with a liquid mixture of water and a separating agent between two rollers of a molding station,
wherein the rollers respectively provide a corrugated profiling in a peripheral direction of an external surface of the rollers, such that the original plate is being deformed in sections into a plate with a wave shape,
wherein rollers are being used, the respective profiling of which has half-waves which follow one another in the peripheral direction and which have a different extension in the peripheral direction.

2. The method according to claim 1, in which rollers are used, the respective profiling of which has half-waves which are at least in sections essentially planar to form an essentially flat contact surface on the side of the plate.

3. The method according to claim 1, in which rollers are being used, the respective profiling of which has half-waves which are at least in sections essentially concave or convex to form an essentially curved contact surface on the side of the plate.

4. The method according to claim 1, in which rollers are being used, the respective profiling of which has exclusively negative or positive half-waves.

5. The method according to claim 1, in which rollers are being used, the respective profiling of which has positive and negative half-waves alternating one after the other in the peripheral direction.

6. The method according to claim 5, in which rollers are being used, the respective profiling of which has two different half-wave configurations, wherein three half-waves of the first half-wave configuration are being followed by one half-wave of the second half-wave configuration.

7. The method according to claim 1, wherein that a wood fiber material plate is being used comprising a surface weight comprised between 1.0 kg/m2 and 3.0 kg/m2.

8. The method according to claim 1, wherein that a wood fiber material plate is being used having a thickness comprised between 1 mm and 3 mm.

9. The method according to claim 1, wherein the deformation will be performed at a temperature in the range comprised between 200° C. and 300° C.

10. The method according to claim 1, wherein the deformation is being performed at a line load in the range comprised between 100 N/mm and 300 N/mm.

11. The method according to claim 1, wherein the method is carried out continuously.

12. The method according to claim 1, wherein that a MDF-plate is being used as the flat wood fiber material plate.

* * * * *